March 20, 1962 J. G. BAKER 3,026,512
MULTIPLE DISPLAY ILLUMINATION DEVICE
Filed Nov. 3, 1959
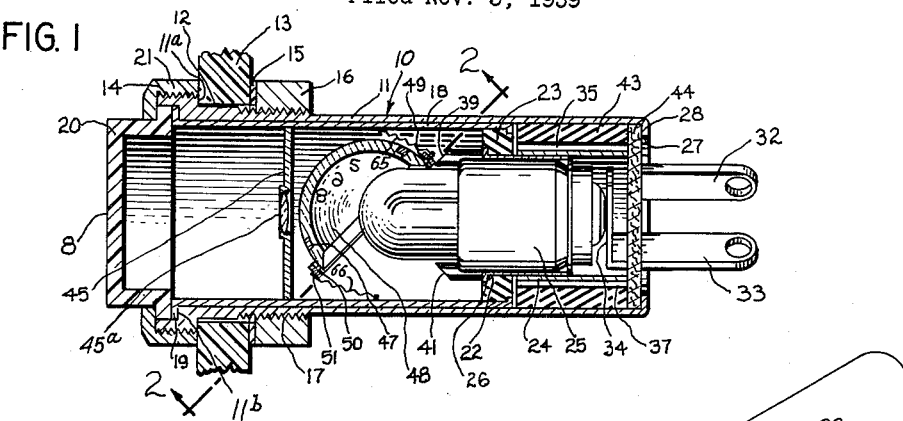
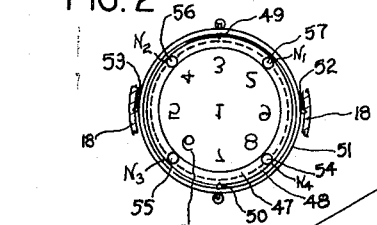
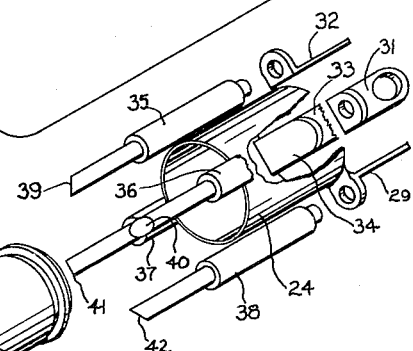
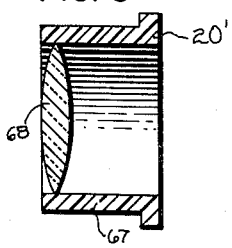
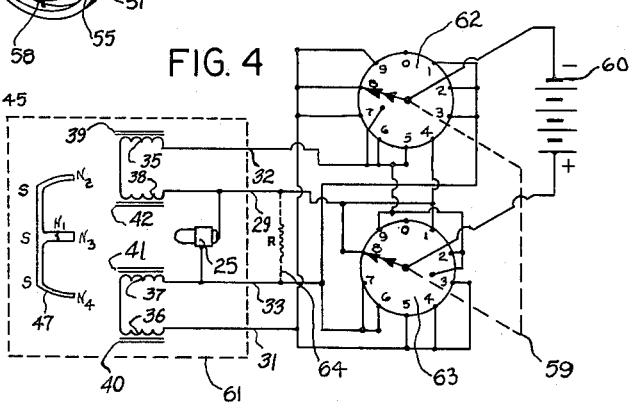
INVENTOR.
JACOB G. BAKER
BY
Mason, Fenwick & Lawrence
Attorneys United States Patent Office 3,026,512
Patented Mar. 20, 1962

3,026,512
MULTIPLE DISPLAY ILLUMINATION DEVICE
Jacob G. Baker, Dallas, Tex.
Filed Nov. 3, 1959, Ser. No. 850,662
3 Claims. (Cl. 340—373)

The present invention relates in general to changeable display devices, and more particularly to multicolor or multisymbol indicating lights and projecting devices.

The principal object of the invention disclosed herein is to provide an indicating light or projector whereby colored light, printed messages or symbols and the like may be selectively displayed in a permanent or continuously changing manner.

A further object of the invention is the provision of novel illumination means which is capable of displaying a plurality of colors or messages with each color or message conveying to the viewer distinct signals, decorative effects, quantitative or qualitative data, and positioning or progression information.

Another object of the present invention is the provision of a novel indicating lamp for producing a plurality of distinct colors or conditions to permit display of a large number of selective conditions with a minimum number of lamps.

Other objects of this invention are to provide in an indicating lamp or projector a minimum number of component parts which in turn permit a sizeable reduction in the size and weight of this apparatus over previous indicating lights or projectors utilizing multiple lamps, fixed color and message lenses and the like, and to further provide in an indicating light or projector a means for exchanging the lamp from the front side of the mounting panel.

Other objects, advantages and capabilities of the present invention will become apparent from the following detail description taken in conjunction with the accompanying drawing illustrating one preferred embodiment of the invention.

In the drawing:

FIGURE 1 is a longitudinal vertical section view of a light or projection assembly embodying the present invention;

FIGURE 2 is a fragmentary rear elevation of the light modifying mask and support taken along the line 2—2 of FIGURE 1;

FIGURE 3 is an exploded view of the principal parts shown in FIGURE 1 and showing with somewhat more clarity their working or functional relationship with each other;

FIGURE 4 is a schematic diagram of the electrical circuit and exemplary for use with the light assembly; and FIGURE 5 is a sectional view of the optional lens assembly that permit projection of printed messages and colored light to a remote, externally mounted screen or viewing surface.

Referring to the drawing, wherein like reference characters designate corresponding parts throughout the several figures, the multicolor light assembly of the present invention, generally indicated by the reference character 10, is housed within an elongated tubular cylindrical shell or housing 11 adapted to fit into an accommodating opening 12 in a control panel or other suitable supporting panel 13. The cylindrical housing 11 is provided with an outwardly offset formation or lip 11a at its outer end providing a shoulder which will abut the portions of the control panel 13 bounding the opening 12, and the housing is held in position by a lock washer 15 and a nut 16 which may be threaded onto external threads 17 provided on the outer surface of the housing 11, or by other conventional locking means.

A tubular shield mount 18 is disposed within the forward portion of the housing 11 and has an outwardly projecting flange 19 bearing against a shoulder 11b of the offset formation 11a. The cover glass 20 having a flange formation at the inner end thereof is seated within the offset formation 11a of the housing 11 in abutment with the flange 19 and is secured in position by means of a knurled nut 21 which may be threaded onto external threads 14 provided on the outer surface of the offset formation 11a. A lamp retainer sleeve 22 is disposed in the central region of the housing 11 and is joined to the shield mount 18 by an annular body of insulating material 23. The lamp retainer sleeve is telescopically received within a lamp socket 24. A lamp 25 is supported by the lamp retainer sleeve 22 and includes a base which is removably seated in the lamp retainer sleeve 22 in; electrical contact therewith and a globe portion projecting from the base toward the cover glass 20. It will be noted that the shield mount 18, insulating ring 23 and lamp retainer sleeve 22 supporting the lamp 25 form a unitary assembly which may be withdrawn through the outer end of the cylindrical housing 11 when the nut 21 and cover glass 20 are removed to effect exchange or replacement of the lamp 25 from the front of the control panel 13.

A lamp socket terminal or prong 29 is in electrical communication at its inner end with the socket 24 and the lamp retainer sleeve 22. It is also connected at its inner end to one end of a coil 38 of a first electromagnet 42, and projects through the opening 27 in the rear or inner end 28 of the housing 11. Another prong 33 projects through the opening 27 in the rear end 28 of the housing 11 and is connected at its forward or inner end to one end of a coil 37 of electromagnet 41 and to the lamp base terminal 34, whereby, when the prongs 29 and 33 are connected with a source of electrical current, current will flow through the prong 29, the lamp socket 24, the lamp retainer sleeve 22, through the filament of lamp 25, the lamp base terminal 34 and prong 33, thereby causing lamp 25 to glow for the first condition listed in schedule of operation below.

An additional terminal or prong 32 projects through the opening 27 in the inner end 28 of the housing 11 and is connected at its inner end to one end of a coil 35 of electromagnet 39, the opposite end of coil 35 being connected in series with one end of coil 38 of electromagnet 42. Electromagnets 42 and 39 being series connected form a functional pair and are diagonally disposed with the core of coil 35 parallel to the core of coil 38 and legs or pole pieces 39 and 42 extending to the forward portion of the housing 11. In a like manner an additional terminal or prong 31 projects through the insulator 44 in opening 27 in the inner end 28 of the housing 11 and is connected at its inner end to one end of a coil 36 of electromagnet 40. The opposite end of coil 36 is connected in series with one end of coil 37 of electromagnet 41, thus forming a second functional pair diagonally disposed with the core of coil 36 parallel to the core of coil 37 and legs or pole pieces 40 and 41 extending to the forward portion of the housing 11 and the plane of the functional pair 40 and 41 lying perpendicular to the plane of the second pair of electromagnets 39 and 42.

When electrical current is caused to flow through various combinations of the four terminals or prongs 29, 31, 32 and 33 the inner extremities of the pole pieces 39, 40, 41 and 42 will selectively assume magnetic properties of a north or south character according to the following schedule of operation:

| Condition | Terminal Electrical Potential | | | | Electromagnet Polarity | | | |
|---|---|---|---|---|---|---|---|---|
|  | 29 | 31 | 32 | 33 | 42 | 40 | 39 | 41 |
| 1 | + |   |   | − | (1) | (1) | (1) | (1) |
| 2 |   |   | + | − | S | S | N | N |
| 3 |   | + | + | − | S | N | N | S |
| 4 |   | + |   | − | N | N | S | S |
| 5 | − | + |   |   | N | N | S | S |
| 6 |   |   | − | + | N | S | S | N |
| 7 |   | − |   | + | S | S | N | N |
| 8 | + | − |   |   | S | S | N | N |
| 9 |   | − | + |   | S | N | N | S |
| 0 | (2) | (2) | (2) | (2) | (1) | (1) | (1) | (1) |

¹ Neutral.  ² Off.

A waferlike insulator 44 electrically isolates the lamp socket 24 from the base terminal 34 and also serves to position and secure the lamp socket 24, base terminal 34, terminals 29, 31, 32 and 33, and electromagnet cores 39, 40, 41 and 42. Further electrical isolation, component positioning and seal is achieved by encapsulation material 43.

The shield mount 18 includes a light shield and optic support 45 disposed to lie between the globe of the lamp 25 and the cover glass 20 and having a boss 45 to receive and position an optical lens 45a therein along the optical axis of the apparatus.

Spaced rearwardly from the shield portion 45 is a hemispherical light modifying mask 48. The mask 48 is gimbal mounted to effect displacement or tilt about the hemispheric axis, support for the mask being effected by two pivotal mounting shafts or pins 49 and 50 located 180° apart and directed toward the center from a ring mount 51. The ring mount 51 is in turn positioned and supported within the shield mount 18 by two pivotal mounting shafts or pins 52 and 53 located 180° apart but with their center line in the same plane but at right angles to pins 49 and 50 and directed outward from the center of ring mount 51 to engage receiving recessed indentations in the shield mount 18 located in a plane perpendicular to the axis of the cylindrical housing 11.

The mask 48 includes a ring and spiderlike permanent magnet 47 imbedded therein, there being four extremities, legs or poles 54, 55, 56, 57 positioned 90° apart and north in magnetic character and directed toward the equatorial edge of the hemispheric mask 48 so that each of the legs or poles is positioned opposite to and forward of a confunctional electromagnet. The ring portion of the spider permanent magnet 47 is south in magnetic character and is directed away from the equatorial edge of the hemispheric mask 48 and toward the forward or viewing end of the apparatus and indicated, for example, by the symbols S in FIGURE 4 of the drawing, the legs 54—57 of which therein are labeled N₁, N₂, N₃, and N₄ to indicate their magnetic polarity. The mask 48 is divided into a plurality of zones as indicated at reference number 58 in FIGURES 2 and 3 and related to the pole positions of spider magnet 47, each zone carrying or bearing a different symbol message or color so as to modulate the light directed from the lamp 25 toward the cover glass 20.

The arrangement is such that when current is caused to flow through the coils of either functional pair of electromagnets 39 and 42 and/or 40 and 41, a magnetic field is established causing a magnetic polarity at the forward ends of the legs or cores 39 and 42 of coils 35 and 38 and/or at the forward ends of the legs or cores 40 and 41 of coils 36 and 37. The magnetic field thus produced reacts on one or more of the legs of the spider magnet 47 in an attraction or repulsion manner thereby causing the mask 48 to tilt or shift within the gimbal ring 51 and shield mount 18 and selectively position one of the characters, symbols, messages or colors 58 before the optical lens 45a in the shield mount 45 so as to selectively effect one of the conditions listed in the schedule of operations above. The neutral position is effected by centering springs 65 and 66 mounted on or attached to the gimbal ring 51 so as to center both the gimbal ring 51 and mask 48 when there is no magnetically induced force in either of the electromagnet functional pairs 40 and 41 or 39 and 42.

There is illustrated in FIGURE 4 one type of electrical circuit which may be used to control the above-described apparatus. In FIGURE 4, the portion of the circuit within the dotted area 61 represents the internal electrical circuit of the illuminating device 10, the prongs or terminals 29, 31, 32 and 33 being the electrical exits from the apparatus 10. These may be connected in the manner illustrated in FIGURE 4 with a pair of ganged switches 62 and 63, the movable and stationary contacts mechanically linked to maintain permanent orientation with respect to each other and function as a switch unit 59. The movable contacts of the ganged switches 62 and 63 are of opposite electrical potential and are connected with a suitable power source indicated by the reference FIGURE 60. By rotation of the movable contacts of the gang switches 62 and 63 to any of the ten related positions, the supply voltage can be supplied to the lamp 25, the functional pair of coils 36 and 37 of electromagnets 40 and 41, and the coils 35 and 38 of electromagnets 39 and 42 in a selective manner to position any of the 9 characters, symbols, messages or colors, generally indicated by the character 58, into alignment with the optical lens 45a and not necessarily in a sequential order.

Thus, for example, if the movable contact arms of the gang switches 62 and 63 are in the position illustrated in FIGURE 4, a circuit will be established from the negative terminal of the battery or power source 60 to the prong 31 connected to one end of coil 36 of electromagnet 40, the other end of which is connected in series to one end of coil 37 of electromagnet 41 of which in turn one end is connected to prong 33 and to the lamp base terminal 34 whence current is caused to be directed through the filament of lamp 25 thence through the lamp retainer sleeve 22, the lamp socket 24 and prong 29 to the positive terminal of the battery or power source 60. This will establish a magnetic field of appropriate polarity between the ends of the legs or pole pieces of electromagnets 40 and 41 which will cause the spiderlike permanent magnet 47 imbedded in the mask 48 to react or shift and position the symbol, character, message and/or color, for example the numeral 8 on the mask 48 shown in FIGURE 2, in alignment with the optical lens 45a. Likewise, the establishment of an electrical potential across any two or more prongs or terminals will selectively cause one of the ten conditions, and hence electromagnet polarities, as listed in the schedule of operation above, to exist. Although rotation of the ganged switch 59 causes a sequential ascending or descending order of events to occur, suitable changes in the switching mode by relays or other means will permit direct selection with not more than one intervening step or condition.

Under certain conditions, it may be necessary or desirable to insert a variable or fixed resistance 64 in parallel circuitry with the lamp 25 to increase the flow of current through the electromagnets.

There is illustrated in FIGURE 5 an optional lens assembly indicated by the reference character 20', which may be substituted for the cover glass 20, which comprises an outer optical lens member 67 having the same exterior mounting configuration as the cover glass 20 but which includes suitable optical lenses indicated at 68 to permit external projection of the symbols, characters, messages and/or color upon a suitable externally mounted viewing surface.

While but one specific embodiment of the present invention has been particularly shown and described, it will be apparent that various modifications may be made therein within the spirit and scope of the invention, and it is desired, therefore, that only such limitations shall be placed thereon as are imposed by the prior art and set forth in the appended claims.

What is claimed is:

1. A changeable illuminating device comprising a housing having a viewing end and a rear end, a source of light arranged within said housing for directing light rays along a principal optical axis toward said viewing end, a mask member having a selected part thereof normally intercepting said optical axis and having a plurality of angularly spaced light modulating zones each of a different character spaced radially from said selected part, universal mounting means for pivotally supporting said mask member within said housing for pivotal movement about a pair of axes disposed transverse to the principal optical axis of said housing and at right angles to each other to permit displacement of said selected part of said mask radially in any angular direction from said optical axis for disposing any selected one of said light modulating zones in intercepting relation to said light rays, said mask member including magnet means having like poles disposed quadratically opposite points on said mask member relative to the pivotal axis thereof and occupying a fixed position relative to said zones, and magnetic field generating means disposed within said housing having pole pieces extending to a plurality of different angular positions relative to the axis of said mask member to establish magnetic fields arranged at a plurality of selected angular orientations and polarities relative to the axis of said mask member to force said magnet means and its associated mask member to positions interposing selected zones of said light modulating zones in intercepted relation to said light rays.

2. A changeable illuminating device comprising an elongated tubular cylindrical housing, having a viewing end, a lamp disposed in said housing for directing light rays along a principal optical axis toward said viewing end, a hemispherical mask member having its center normally intercepting said principal optical axis and having a plurality of light modulating zones each of a different character positioned at different angular positions about the center of and at the center of said mask member, gimbal mounting means pivotally supporting said mask member within said housing for pivotal movement about first and second axes disposed perpendicular to each other and transverse to the principal optical axis to permit displacement of the center of said mask radially in any angular direction from said optical axis for disposing any selected one of said zones in intercepting relation to said light rays to modulate said light rays upon movement of said mask member about its pivotal axes, said mask member including a magnet occupying a fixed position relative to said zones and having opposite poles spaced at quadratically opposite points relative to the pivotal axis of said mask member, magnetic field generating means located within said housing, and means for shifting the polarity and orientation of the magnetic field produced by said field generating means to force said magnet to position said mask member about its pivotal axes to dispose selected light modulating zones in intercepting relation to said light rays.

3. A changeable illuminating device comprising an elongated tubular cylindrical housing having a viewing end, a lamp disposed in said housing for directing light rays along a principal optical axis toward said viewing end, a hemispherical mask member having its center normally intercepting said principal optical axis and having a plurality of light modulating zones each of a different character positioned at different angular positions relative to the center of said mask member, gimbal mounting means pivotally supporting said mask member within said housing including a ring mount, means supporting said ring mount for pivotal movement about a diametric axis thereof within said housing transverse to said principal optical axis and means mounting said mask member within said ring mount for pivotal movement about a diametric axis thereof perpendicular to said first-mentioned diametric axis to permit displacement of the center of said mask member radially in any direction from said principal optical axis for disposing selected ones of said zones in intercepting relation to said light rays to modulate said light rays upon angular adjustment of said mask member about its pivotal axes, said mask member including a magnet occupying a fixed position relative to said zones and having like poles spaced at quadratically opposite points relative to the pivotal axes of said mask member, a first functional pair of electromagnets having cores including a pair of parallel legs terminating adjacent the periphery of said mask member for establishing a magnetic field oriented along a first field axis, a second functional pair of electromagnets having cores including a pair of parallel legs terminating adjacent the periphery of said mask member for establishing a magnetic field oriented along a second field axis located at right angles to said first field axis, and means for selectively energizing said functional pairs of electromagnets to establish magnetic fields along either or both of said first and second field axes and means for reversing the polarity of said magnetic fields to produce magnetic field conditions within said housing for forcing said magnet and its associated mask member to selected angular positions about the pivotal axes thereof to dispose selected zones of light modulating zones in intercepting relation to said light rays.

References Cited in the file of this patent

UNITED STATES PATENTS

| | | |
|---|---|---|
| 1,638,614 | Brewster | Aug. 9, 1927 |
| 2,053,826 | Hallerberg | Sept. 8, 1936 |
| 2,415,452 | Taylor et al. | Feb. 11, 1947 |
| 2,632,888 | Brookes et al. | Mar. 24, 1953 |
| 2,740,955 | Barrett | Apr. 3, 1956 |

FOREIGN PATENTS

| | | |
|---|---|---|
| 486,326 | Great Britain | June 2, 1938 |
| 956,702 | Germany | July 5, 1956 |